US012137035B2

(12) United States Patent
Zhang et al.

(10) Patent No.: US 12,137,035 B2
(45) Date of Patent: Nov. 5, 2024

(54) NETWORK DATA ANALYTICS FUNCTION SELECTION

(71) Applicant: QUALCOMM Incorporated, San Diego, CA (US)

(72) Inventors: Juan Zhang, Beijing (CN); Haris Zisimopoulos, London (GB); Gavin Bernard Horn, La Jolla, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/911,122

(22) PCT Filed: Apr. 21, 2020

(86) PCT No.: PCT/CN2020/085875
§ 371 (c)(1),
(2) Date: Sep. 12, 2022

(87) PCT Pub. No.: WO2021/212310
PCT Pub. Date: Oct. 28, 2021

(65) Prior Publication Data
US 2023/0117382 A1    Apr. 20, 2023

(51) Int. Cl.
*H04L 41/14* (2022.01)
*H04L 41/08* (2022.01)

(52) U.S. Cl.
CPC .............. *H04L 41/14* (2013.01); *H04L 41/08* (2013.01)

(58) Field of Classification Search
None
See application file for complete search history.

(56) References Cited

U.S. PATENT DOCUMENTS 9,270,709 B2 *  2/2016  Shatzkamer ............ H04L 67/61
10,911,326 B2 *  2/2021  Han ........................ H04L 41/14
(Continued)

FOREIGN PATENT DOCUMENTS

CN    110569288 A    12/2019
CN    110677299 A    1/2020
(Continued)

OTHER PUBLICATIONS

Ericsson: "Solution on How to Find an Associated NWDAF," 3GPP SA WG2 Meeting #136AH, S2-2000167, Jan. 13-17, 2020 (Jan. 17, 2020) sections 6.x.1, 4 pages.
(Continued)

*Primary Examiner* — Ranodhi Serrao
(74) *Attorney, Agent, or Firm* — Procopio, Cory, Hargreaves & Savitch LLP

(57) ABSTRACT

A method, a computer-readable medium, and an apparatus are provided for a network entity. The network entity receives an analytics request from a consumer, the analytics request indicating at least one analytic and determines one or more network data analytics functions (NWDAFs) for the analytics request based on the at least one analytic indicated in the analytics request. A consumer sends an analytics request to a network entity including one or more analytics identifiers. The consumer receives, from the network entity, a response to the analytics request including an analytics output from one or more NWDAFs based on the analytics identifier(s) included in the analytics request. An NWDAF sends an analytics identifier registration to a network entity indicating one or more analytics supported by the NWDAF. Then, the NWDAF receives an analytics request(s) from consumer(s) via the network entity based on the NWDAF supporting an analytic in the analytics request.

13 Claims, 7 Drawing Sheets

(56) References Cited

U.S. PATENT DOCUMENTS

| | | | |
|---|---|---|---|
| 10,939,447 B2* | 3/2021 | Cheng | H04W 4/70 |
| 2011/0238793 A1* | 9/2011 | Bedare | H04L 61/5061 |
| | | | 709/224 |
| 2012/0150960 A1* | 6/2012 | Nalawade | G06Q 50/01 |
| | | | 709/204 |
| 2013/0246334 A1* | 9/2013 | Ahuja | G06F 16/93 |
| | | | 707/600 |
| 2014/0195380 A1* | 7/2014 | Jamtgaard | G06Q 30/0601 |
| | | | 709/224 |
| 2014/0274135 A1* | 9/2014 | Edge | H04W 4/021 |
| | | | 455/456.2 |
| 2015/0019746 A1* | 1/2015 | Shatzkamer | H04W 76/10 |
| | | | 709/228 |
| 2015/0289123 A1* | 10/2015 | Shatzkamer | H04W 4/24 |
| | | | 455/406 |
| 2016/0036764 A1* | 2/2016 | Dong | H04L 45/22 |
| | | | 370/254 |
| 2017/0339003 A1* | 11/2017 | Åström | H04L 41/0886 |
| 2017/0339023 A1* | 11/2017 | Åström | H04L 41/14 |
| 2018/0048673 A1* | 2/2018 | Hunt | H04L 63/1425 |
| 2019/0230645 A1* | 7/2019 | Cheng | H04W 12/08 |
| 2019/0356558 A1* | 11/2019 | Han | H04L 41/14 |
| 2020/0396677 A1* | 12/2020 | Estevez | H04L 41/145 |
| 2021/0105656 A1* | 4/2021 | Estevez | H04L 41/5067 |
| 2021/0144076 A1* | 5/2021 | Lee | G06F 18/214 |
| 2021/0273856 A1* | 9/2021 | Marquezan | H04W 24/02 |
| 2021/0297874 A1* | 9/2021 | Marquezan | G06F 16/90335 |
| 2021/0351993 A1* | 11/2021 | Puente Pestaña | H04L 41/046 |
| 2022/0046101 A1 | 2/2022 | Zhang | |
| 2022/0103443 A1* | 3/2022 | Mary | H04L 43/20 |
| 2022/0337474 A1* | 10/2022 | Consoli | H04L 41/0604 |
| 2022/0368617 A1* | 11/2022 | Xin | H04L 41/5067 |
| 2023/0044850 A1* | 2/2023 | Vaishnavi | H04L 41/14 |
| 2023/0069455 A1* | 3/2023 | Marquezan | H04L 43/04 |

FOREIGN PATENT DOCUMENTS

| | | |
|---|---|---|
| CN | 110798360 A | 2/2020 |
| WO | 2020066890 A1 | 4/2020 |
| WO | 2020070118 A1 | 4/2020 |

OTHER PUBLICATIONS

Huawei, et al., "Solution to Multiple NWDAF Instances," 3GPP SA WG2 Meeting #136AH, S2-2001210, Jan. 13-17, 2020 (Jan. 17, 2020), sections 6.x.1.1-6.x.1.2, 7 pages.

International Search Report and Written Opinion—PCT/CN2020/085875—ISA/EPO—Jan. 20, 2021.

Supplementary Partial European Search Report—EP20932788—Search Authority—Munich—Apr. 5, 2024.

* cited by examiner

NETWORK DATA ANALYTICS FUNCTION SELECTION

CROSS REFERENCE TO RELATED APPLICATION(S)

This application is a National Stage Application filed under 35 U.S.C. § 371 of PCT International Application No. PCT/CN2020/085875, entitled "NETWORK DATA ANALYTICS FUNCTION SELECTION" and filed Apr. 21, 2020, which is expressly incorporated by reference herein in its entirety.

BACKGROUND

Technical Field

The present disclosure relates generally to communication systems, and more particularly, to a communication system including one or more network data analytics function (NWDAF).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In some aspects, the method may be performed by an apparatus at a network entity. The apparatus receives an analytics request from a consumer, the analytics request indicating at least one analytic; and determines one or more network data analytics functions (NWDAFs) for the analytics request based on the at least one analytic indicated in the analytics request.

In another aspect of the disclosure, a method, a computer-readable medium, and an apparatus are provided. In some aspects, the method may be performed by an apparatus at a consumer. The apparatus sends an analytics request to a network entity, the analytics request including at least one analytics identifier; and receives, from the network entity, a response to the analytics request, wherein the response includes an analytics output from one or more NWDAFs based on the at least one analytics identifier included in the analytics request.

In another aspect of the disclosure, a method, a computer-readable medium, and an apparatus are provided. In some aspects, the method may be performed by an apparatus at an NWDAF. The apparatus sends an analytics identifier registration from the NWDAF to a network entity, where the analytics identifier registration indicates one or more analytics supported by the NWDAF. Then, the apparatus receives an analytics request from a consumer via the network entity based on the NWDAF supporting an analytic in the analytics request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
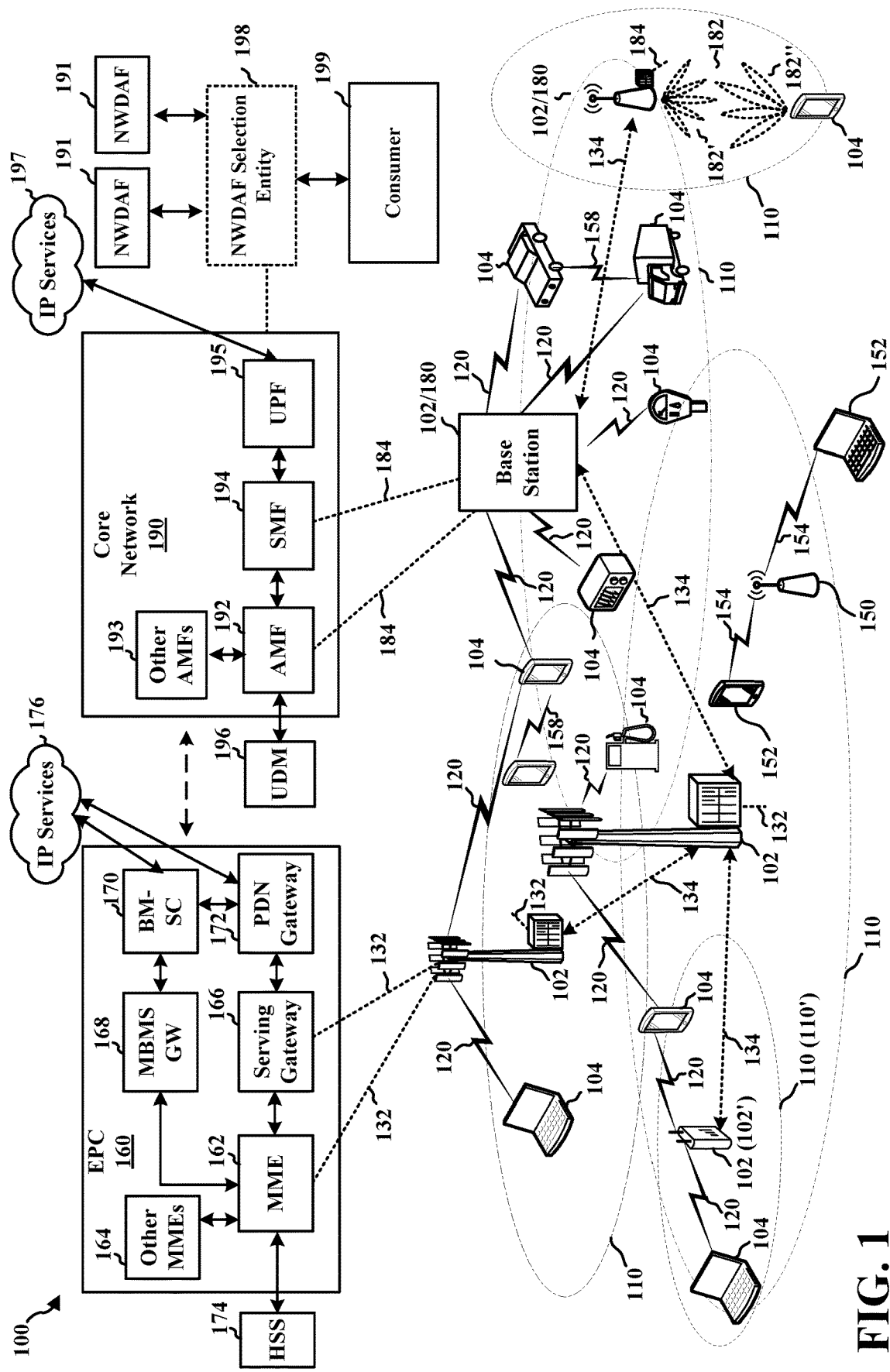
FIG. 1 is a diagram illustrating an example of a wireless communications system and an access network, in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 2:
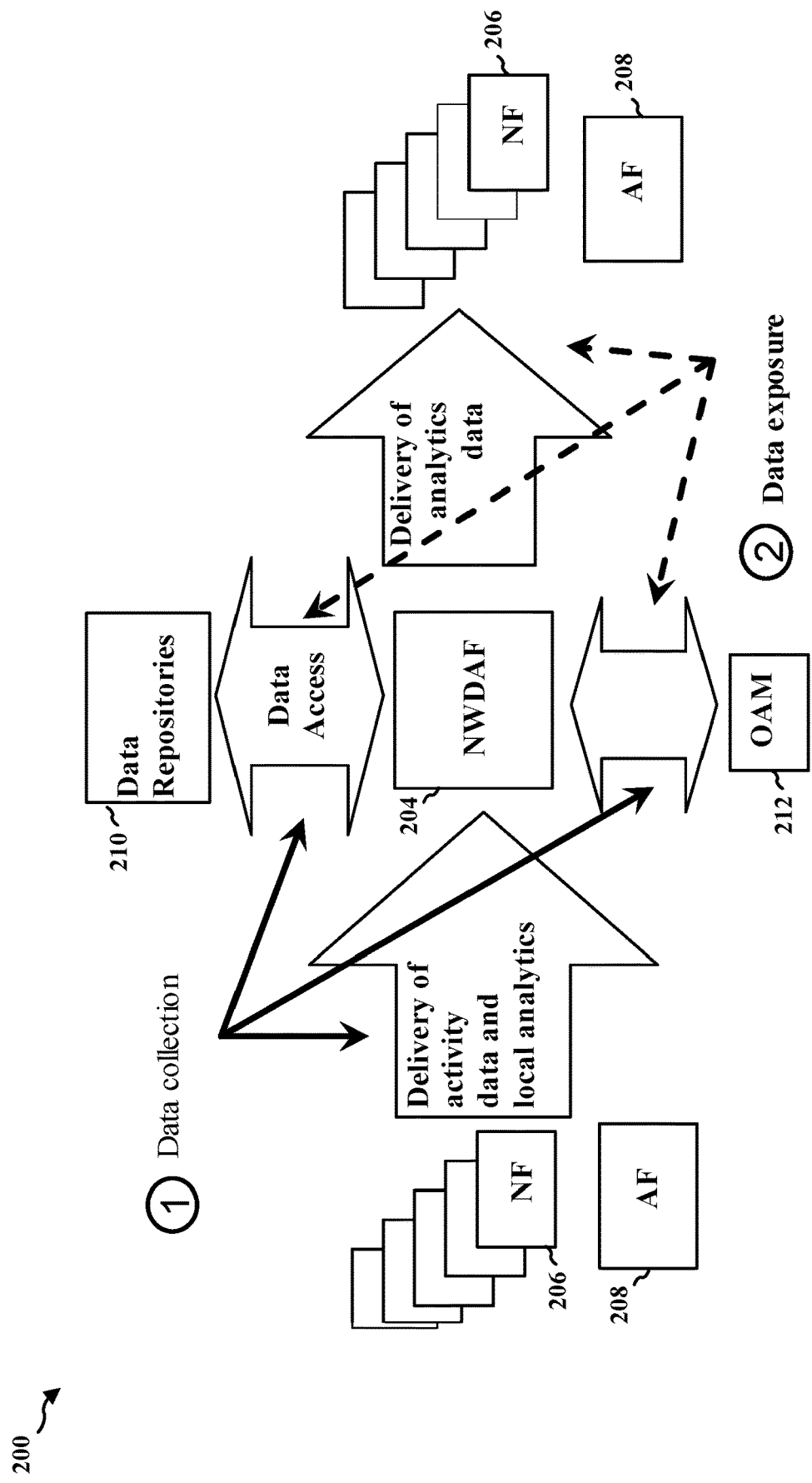
FIG. 2 illustrates aspects of data collection and delivery of analytics data, in accordance with aspects presented herein.

An NWDAF is a core network entity that collects and analyzes data from network sources and outputs data analytics to consumers, as descried in more detail in connection with FIG. 2. The NWDAF provides for data collection and data analytics in a centralized manner. The interactions between consumers and the NWDAF may take place in a local PLMN (e.g., a consumer network function (NF) and the NWDAF may belong to the same PLMN). Aspects presented herein enable support for multiple NWDAFs in a PLMN. Different NWDAFs may provide different types of analytics results. If multiple NWDAFs are deployed and support different data analytics, it may be challenging for the consumer to select a suitable NWDAF. The present disclosure provides a central entity that coordinates analytics requests from consumers that may be performed by any of multiple NWDAFs and enables consumers to obtain appropriate analytics information from various NWDAFs.

FIG. 1 is a diagram illustrating an example of a wireless communications system and an access network 100 that includes a core network 190 and an NWDAF selection entity 198 that is a central entity that coordinates requests for analytics information from one or more consumers 199 and multiple NWDAFs 191. The NWDAF selection entity 198 may be configured to receive an analytics request from a consumer, the analytics request indicating at least one analytic (e.g., analytics ID(s) and a location) and to determine one or more NWDAFs 191 for the analytics request based on the at least one analytic indicated in the analytics request. The consumer 199 may be configured to send an analytics request that includes at least one analytics ID. The request may also include a location corresponding to the requested analytics ID. The consumer 199 may receive, from the NWDAF selection entity 198, a response to the analytics request that includes an analytics output from one or more NWDAFs 191 based on the at least one analytics identifier included in the analytics request. The NWDAFs 191 may be configured to register with the NWDAF selection entity 198 and to provide supported analytics IDs and corresponding areas.

The wireless communications system 100 (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2 illustrates an example system 200 including an NWDAF 204 that collects and analyzes data from network sources and outputs data analytics to consumers. NWDAF is a core network function that provides for data collection and data analytics in centralized manner. For example, the NWDAF may be a network entity associated with the core network 190 in FIG. 1. The NWDAF may provide network analysis information upon request from consumers, such as network functions, application functions, operation and management (OAM), PCF, NSSF, etc. As an example, a PCF may use analytics data in policy decisions. As another example, an NSSF may use load level analytics information provided by NWDAF for slice selection. As an example, an NWDAF may be used for analytics for one or more Network Slice.

For example, a network function (NF) may request specific analysis information on the load level of a particular network slice. Alternatively, the NF may use a subscribe service to be notified by the NWDAF if the load level of a network slice changes or reaches a specific threshold. NFs and an OAM may request and use the data analytics provided by NWDAF to improve the network performance. The NWDAF may provide analytics for, e.g. QoS, traffic steering, dimensioning, security, etc.

As illustrated in FIG. 2, the NWDAF may collect data from multiple sources, e.g., including NFs 206 and application functions (AFs) 208, OAM 212, a unified data repository (UDR) 210, etc. Examples of NFs that may provide data include an AMF (such as AMF 192 in FIG. 1), an SMF (such as SMF 194 in FIG. 1), a PCF, a UDR 210, a network exposure function (NEF), etc. The NWDAF 204 performs analytics on the collected data and outputs, in response to a consumer request, analytics data. The consumers of the data may include, e.g., NFs 206, AFs 208, OAM 212, PCF, NSSF, etc. The NWDAF may be controlled by the network operator. The interactions between consumers and the NWDAF may take place in a local PLMN (e.g., an NF and the NWDAF belong to the same PLMN).

Figure 3:
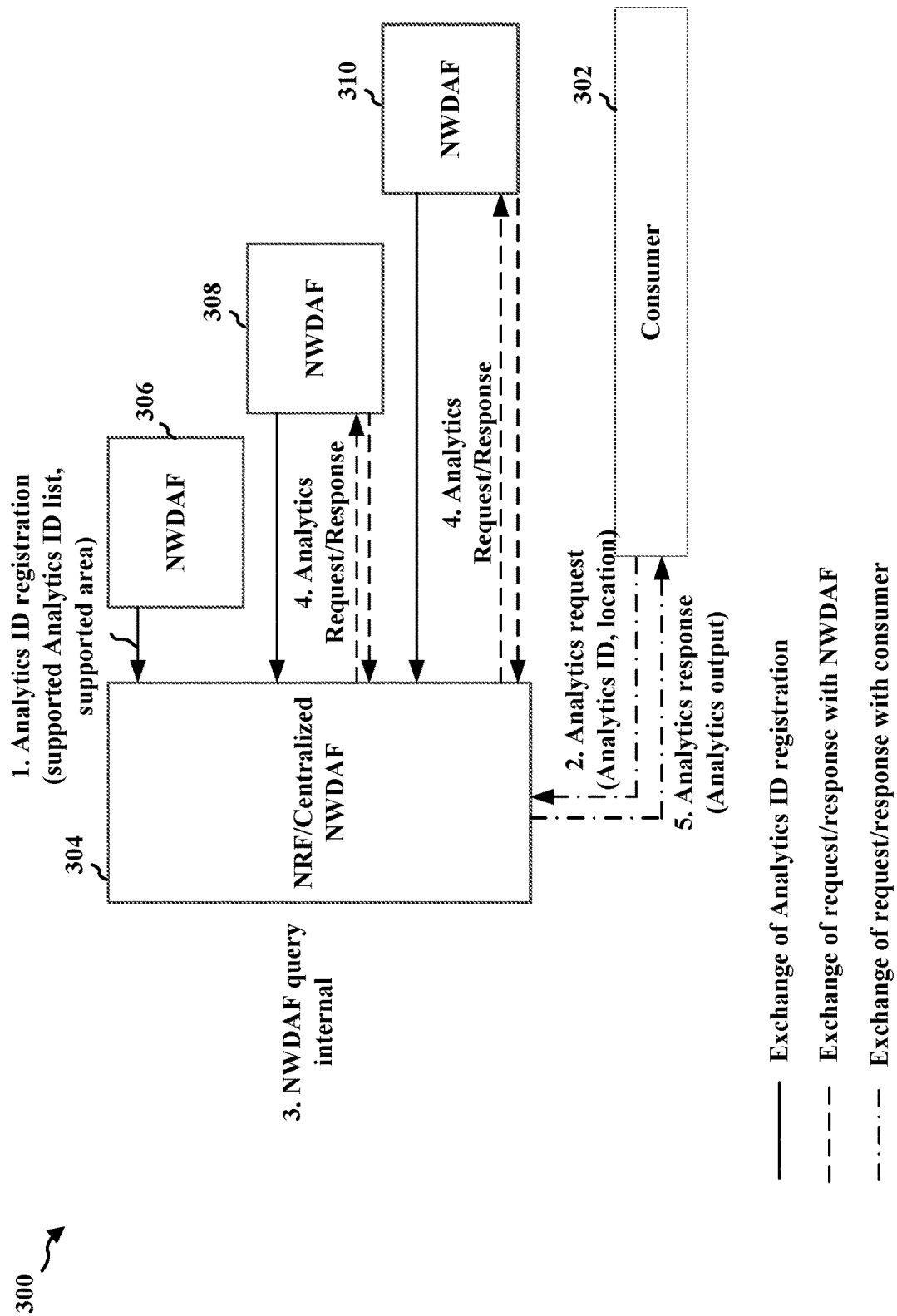
FIG. 3 illustrates an example communication flow between a consumer, a network entity, and multiple NWDAFs, in accordance with aspects presented herein.

Aspects presented herein enable support for multiple NWDAFs in a PLMN. Different NWDAFs may provide different types of analytics results. If multiple NWDAFs are deployed and support different data analytics, it may be challenging for the consumer to select a suitable NWDAF. FIG. 3 illustrates an example system that includes a central entity 304 that coordinates analytics requests from consumers that may be performed by any of multiple NWDAFs, e.g., in a PLMN. The central entity may be a network entity of a core network. The central entity may comprise a network report function (NRF). An NRF may be used by an AMF to query information about an SMF for a slice. The NRF may assist with network selection. As presented herein, the NRF may also function as a central entity to coordinate the direction of analytics request from consumers 302 to one or more NWDAFs 306, 308, 310 and to provide the analytics output from various NWDAFs back to the consumers 302. In another example, the central entity 304 may comprise a centralized NWDAF that coordinates the direction of analytics request from consumers to other NWDAFs 306, 308, and 310 and that provides the corresponding output back to the consumers 302.

As illustrated in FIG. 3, each of the NWDAF2 306, 308, 310 may register with the central entity 304. The registration may include information about supported analytics. In a first message (1) in FIG. 3, NWDAF sends an analytics ID registration to the central entity 304. The analytics ID registration may indicate one or more analytics identifier (ID) that is supported by the NWDAF 306 and a supported area. The supported area may indicate an NWDAF supported network area, a list of tracking areas, or a cell list, for example. In some examples, the NWDAF 306 may provide to the central entity 304 a list of analytics IDS that the NWDAF 306 supports. The central entity 304 may store information about which analytics IDs are supported by the different NWDAFs. The central entity 304 may also store the corresponding supported area for the supported analytics IDs.

A consumer 302 sends an analytics request to the central entity 304 (e.g., analytics request in message (2)). The analytics request from the consumer may include an analytics ID and a corresponding location. In addition to including a single analytics ID, the analytics request from the consumer may include multiple analytics IDs and corresponding location.

The central entity performs an internal query to determine an NWDAF that supports the requests analytics ID for the indicated location (e.g., within a supported area). The central entity then sends the analytics request to the determined NWDAF. The request message may indicate the analytics ID that is supported by the NWDAF, e.g., without additional information about the consumer. The central entity 304 may determine an NWDAF served by the central entity (e.g., which has registered with the central entity) that relates to the analytics ID(s) included in the analytics request message (e.g., that has registered support for a particular analytics ID).

If the analytics request from the consumer includes more than one analytics ID, the central entity 304 may send a corresponding request to different NWDAFs for the different analytics IDs. As illustrated in FIG. 3, the central entity 304 sends a first analytics request (e.g., based on the consumer's inclusion of a first analytics ID and location in the analytics request) to the NWDAF 308. The central entity 304 also sends a second analytics request (e.g., based on the consumer's inclusion of a second analytics ID and location in the analytics request) to the NWDAF 310. The NWDAF 308 and the NWDAF 310 return an analytics response to the central entity 304 with output analytics based on the corresponding requests. The central entity 304 collects each response from the NWDAFs and sends the response(s) to the consumer 302. The responses may be sent in a combined output or may be provided separately to the consumer 302 by the central entity 304. Although a single consumer 302 is shown in FIG. 3 to illustrate the concept, the central entity may receive analytics requests from any number of consumers. The consumers may correspond to the examples discussed in connection with FIG. 2.

Figure 4:
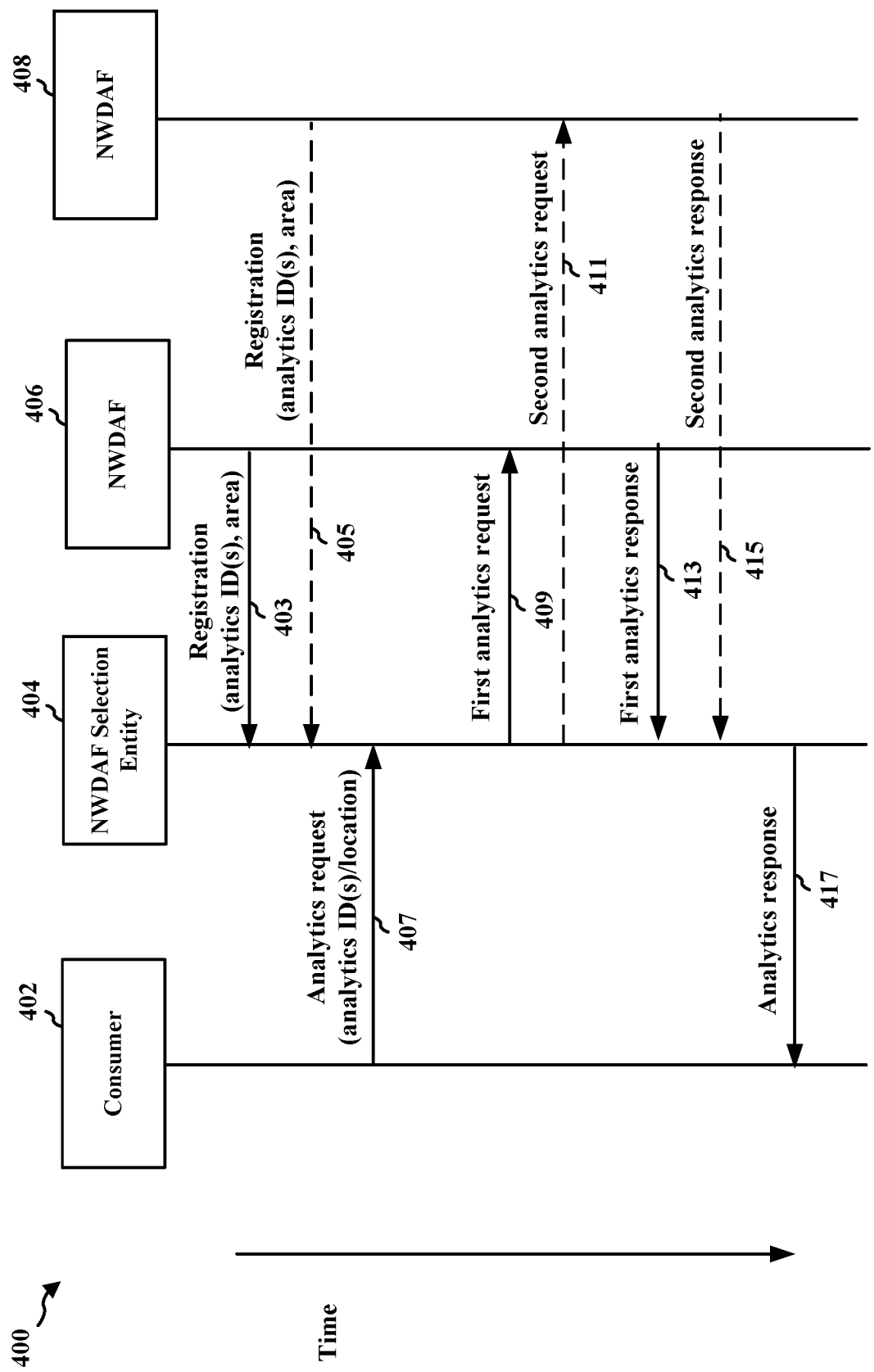
FIG. 4 illustrates an example communication flow between a consumer, a network entity, and multiple NWDAFs, in accordance with aspects presented herein.

FIG. 4 is another example communication flow diagram 400 for communication between a consumer 402, an NWDAF selection entity 404, and multiple NWDAFs 406 and 408. The consumer 402 may be any of the examples of consumers of analytics data described in connection with FIG. 2 or FIG. 3. The NWDAF selection entity 404 may correspond to the central entity 304 in FIG. 3. The NWDAFs 406 and 408 send analytics ID registration information to the NWDAF selection entity 404. The registration may include information described in connection with message (1) in FIG. 3 (e.g., one or more supported analytics IDs and supported area(s)). A consumer 402 sends an analytics request 407 to the NWDAF selection entity 404 that includes one or more analytics IDs and location information, e.g., as discussed in connection with FIG. 3. The NWDAF selection entity 404 uses the received registration information (e.g., received in 403 and 405) to match the analytics ID in the request 407 to one or more NWDAFs. For example if the request 407 includes a single analytics ID, the NWDAF selection entity 404 may identify NWDAF 406 as supporting the analytics ID for an area that includes the location identified in the request 407. The NWDAF selection entity 404 may send an analytics request 409 to the NWDAF 406 indicating the analytics ID. If the request 407 includes more than one analytics ID, at least one of which is not supported by the NWDAF 406, the NWDAF selection entity 404 may match the analytics ID to a NWDAF 408 and may send a second analytics request 411 indicating the second analytics ID. The NWDAF 406 may respond with the requested analytics information corresponding to the first analytics ID, as illustrated at 413. The NWDAF 408 may respond with the requested analytics information corresponding to the second analytics ID, as illustrated at 415. The NWDAF selection entity 404 may collect the analytics information for the different analytics IDs that are received from the NWDAFs 406 and 408 and provide the analytics output in a response 417 to the consumer 402. Although illustrated as a single response 417, in other examples, the NWDAF selection entity 404 may provide analytics output for different analytics IDs and/or from different NWDAFs separately. Although a single consumer 402 and two NWDAFs are shown in FIG. 4 to illustrate the concept, the central entity may receive analytics requests from any number of consumers and may coordinate analytics information from any number of NWDAFs according to the aspects presented herein.

Figure 5:
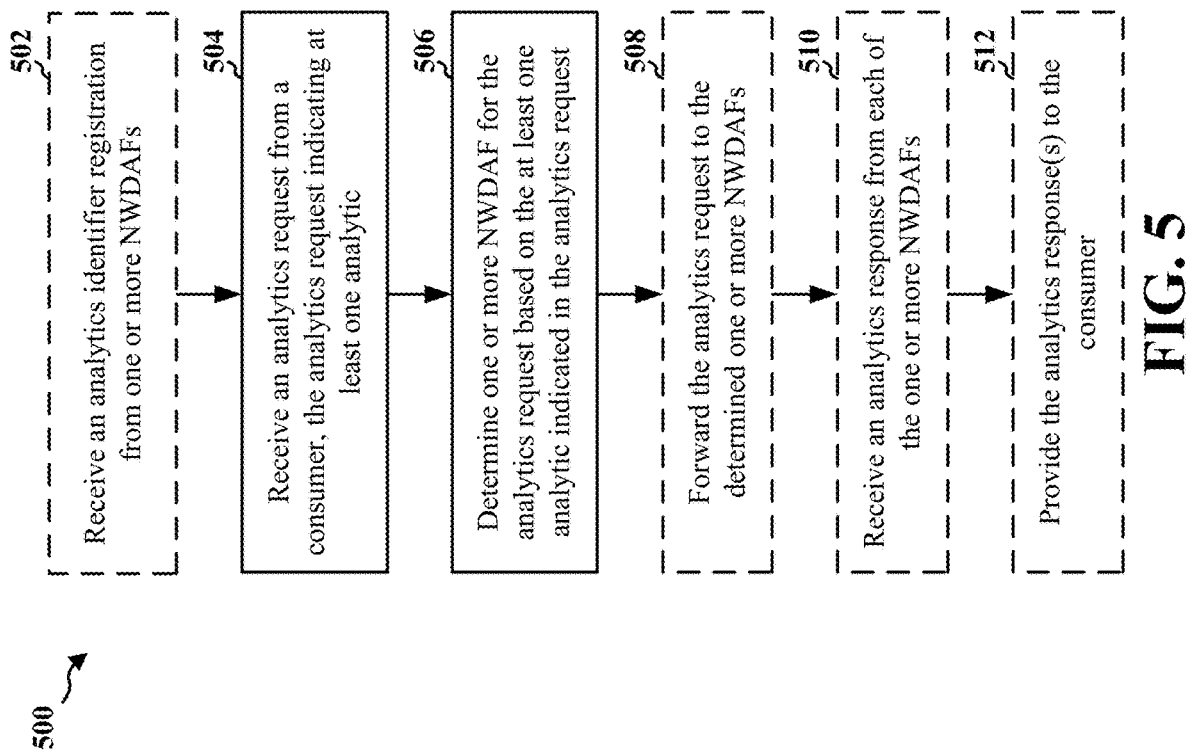
FIG. 5 is a flowchart of a method of wireless communication at a network entity that includes determining an NWDAF to perform an analytics request, in accordance with aspects presented herein.

FIG. 5 is a flowchart 500 of a method of wireless communication. The method may be performed by a network entity or a component of a network entity (e.g., the NWDAF selection entity 198 or 404, the central entity 304; or a processing system, which may include the memory and which may be the entire network entity or a component of the network entity such as a transmission processor, a reception processor, and/or the controller/processor). Optional aspects are illustrated with a dashed line.

At 504, the network entity receives an analytics request from a consumer, the analytics request indicating at least one analytic. The consumer may include a core network entity, an application function, an original equipment manufacturer, etc. The consumer may correspond to the consumer 302 or 402 in FIG. 3 or 4. The analytic(s) in the request may be indicated by at least one analytics identifier included in the analytics request. The request may further include location information. The analytics request may include aspects described in connection with the analytics request from the consumer 302 in FIG. 3 and/or the consumer 402 in FIG. 4.

At 506, the network entity determines one or more NWDAFs for the analytics request based on the at least one analytic indicated in the analytics request. The network entity may identify or otherwise determine the NWDAF(s) to perform the analytics request based on aspects described in connection with FIG. 3 or 4. The analytics request may include multiple analytics identifiers, e.g., a first analytics identifier and a second analytics identifier. The network entity may determine a first NWDAF based on the first analytics identifier and a second NWDAF based on the second analytics identifier.

At 508, the network entity forwards the analytics request to the determined NWDAFs. For example, as described in connection with FIG. 3 and FIG. 4, the network entity may identify an NWDAF that supports the analytics identifier included in the request and may forward the request to that NWDAF. The request may include multiple analytics identifiers, and the network entity may forward the analytics request to a single NWDAF that supports the multiple analytics identifiers. Alternatively or additionally, the network entity may forward a first analytics request to a first NWDAF based on the first NWDAF supporting a first analytics identifier that is the basis for the first request and may forward a second analytics request to a second NWDAF that supports a second analytics identifier that is the basis for the second request.

At 510, the network entity may receive an analytics response from each of the one or more NWDAFs. For example, a single NWDAF may return a single analytics response. A single NWDAF may return multiple analytics responses, e.g., if the NWDAF supports multiple analytics identifiers. The network entity may receive analytics responses from multiple NWDAFs. For example, the network entity may receive a first analytics response from the first NWDAF and a second analytics response from the second NWDAF. The exchange of the request(s) and/or the response(s) between the network entity and the NWDAF(s) may include aspects described in connection with any of FIG. 2, 3, or 4.

As illustrated at 512, the network entity may provide the analytics response(s) to the consumer. For example, the network entity may provide a first analytics response from a first NWDAF and a second analytics response from a second NWDAF to the consumer.

As illustrated at 502, the network entity may receive an analytics identifier registration from the one or more NWDAFs prior to receiving the analytics request, at 604, from the consumer. The network entity may determine the one or more NWDAFs for the analytics request, at 506, further based on the analytics identifier registration from the one or more NWDAFs. For example, the network entity may receive multiple analytics identifier registrations from multiple NWDAFs, e.g., at 502, and may determine the one or more NWDAFs, at 506, from the multiple NWDAFs based on matching a corresponding analytics identifier in the analytics request to a supported analytics identifier for the one or more NWDAFs from the analytics identifier registration of the one or more NWDAFs. Each analytics identifier registration from an NWDAF may include one or more analytics identifiers for analytics that are supported by the NWDAF.

The analytics identifier registration(s) that are received from the NWDAF(s) at 502 may further include a supported area for the one or more NWDAFs. The analytics request that is received from the consumer at 504 may further include a location. The network entity may determine the one or more NWDAFs for the analytics request, at 506, further based on the location included in the analytics request and the supported area for the one or more NWDAFs.

Each block in the aforementioned flowchart of FIG. 5 and/or the aspects that are performed by the central entity 304 in FIG. 3 and/or the NWDAF selection entity 404 in FIG. 4 may be performed by a component of a network apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the network entity for wireless communication includes means for performing the method described in connection with FIG. 5. The aforementioned means may be one or more of the aforementioned components of an apparatus and/or a processing system of such an apparatus configured to perform the functions recited by the aforementioned means. The processing system may include a transmission processor, a reception processor, and a controller/processor. As such, in one configuration, the aforementioned means may be memory and the transmission processor, a reception processor, and a controller/processor configured to perform the functions recited by the aforementioned means.

Figure 6:
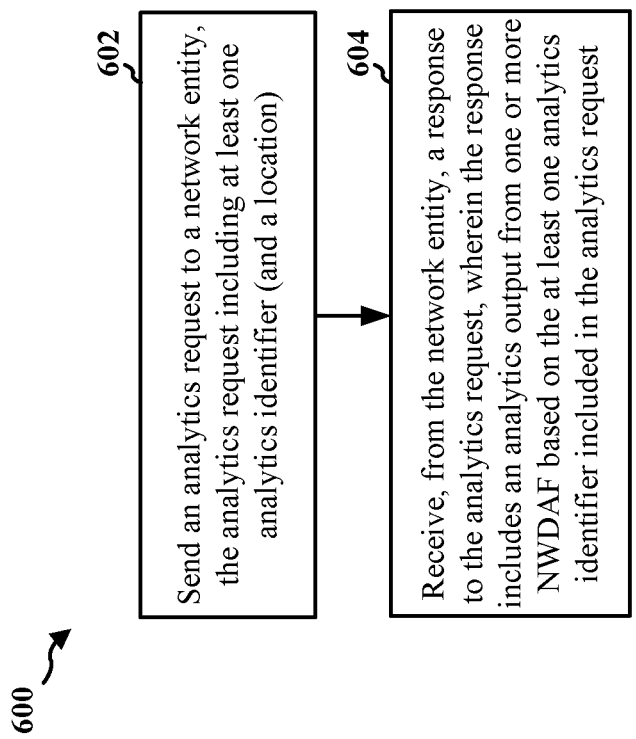
FIG. 6 is a flowchart of a method of wireless communication at a consumer that includes an analytics request that includes an analytics identifier, in accordance with aspects presented herein.

FIG. 6 is a flowchart 600 of a method of wireless communication. The method may be performed by a consumer or a component of a consumer (e.g., the consumer 199, 302, or 402; or a processing system, which may include the memory and which may be the entire consumer or a component of the consumer such as a transmission processor, the a reception processor, and/or the controller/processor). The consumer may include a core network entity, an application function, or an original equipment manufacturer. Optional aspects are illustrated with a dashed line.

At 602, the consumer sends an analytics request to a network entity, the analytics request including at least one analytics identifier. The network entity may correspond to the central entity 304 in FIG. 3 or the NWDAF selection entity 404. The analytics request may further include a location. The network entity may comprise a central NWDAF. The network entity may comprise a network report function.

At 604, the consumer receives, from the network entity, a response to the analytics request, where the response includes an analytics output from one or more NWDAFs based on the at least one analytics identifier included in the analytics request. For example, the response that is received from the network entity may include results from NWDAF (s) that were selected by the network entity to perform the analytics, e.g., such as described in connection with any of FIGS. 4-6.

The analytics request that is sent at 602 may include a first analytics identifier and a second analytics identifier. At 604, the consumer may receive, from the network entity, a first analytics output from a first NWDAF that supports the first analytics identifier and a second analytics output from a second NWDAF that supports the second analytics identifier.

The analytics request that is sent at 602 may further include a location, and the analytics output that may be received based on results from the one or more NWDAFs that are selected by the network entity further based on the location and an area supported by the one or more NWDAFs.

Each block in the aforementioned flowchart of FIG. 6 and/or the aspects that are performed by the consumer 302 in FIG. 3 and/or the consumer 402 in FIG. 4 may be performed by a component of a network apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the network entity for wireless communication includes means for performing the method described in connection with FIG. 6. The aforementioned means may be one or more of the aforementioned components of an apparatus and/or a processing system of such an apparatus configured to perform the functions recited by the aforementioned means. The processing system may include a transmission processor, a reception processor, and a controller/processor. As such, in one configuration, the aforementioned means may be memory and the transmission processor, a reception processor, and a controller/processor configured to perform the functions recited by the aforementioned means.

Figure 7:
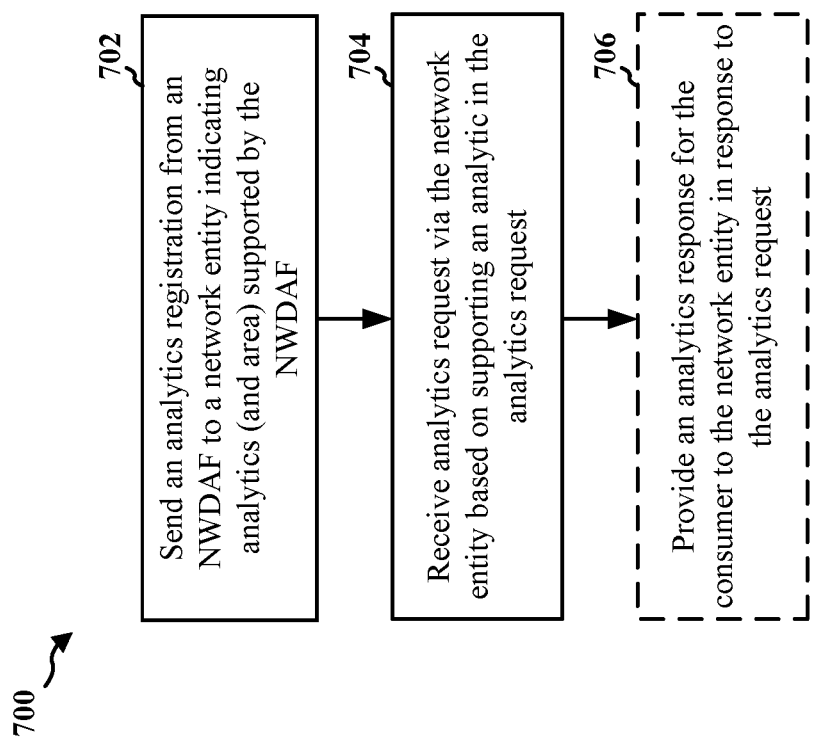
FIG. 7 is a flowchart of a method of wireless communication at an NWDAF that include registration with a network entity indicating support for one or more analytics, in accordance with aspects presented herein.

FIG. 7 is a flowchart 700 of a method of wireless communication. The method may be performed by an NWDAF or a component of an NWDAF (e.g., the NWDAF 191, 306, 308, 310, 406, 408 or a processing system, which may include the memory and which may be the entire NWDAF or a component of the NWDAF such as a transmission processor, the a reception processor, and/or the controller/processor). Optional aspects are illustrated with a dashed line.

At 702, the NWDAF sends an analytics identifier registration from the NWDAF to a network entity, where the analytics identifier registration indicates one or more analytics supported by the NWDAF. The analytic(s) supported by the NWDAF are indicated by one or more analytics IDs. The analytics identifier registration may further indicate an area supported by the NWDAF. In some examples, the network entity may comprise a central NWDAF. In some examples, the network entity may comprise a network report function. The network entity may correspond to the central entity 304 in FIG. 3 or the NWDAF selection entity 404.

At 704, the NWDAF receives an analytics request from a consumer via the network entity based on the NWDAF supporting an analytic in the analytics request. The consumer may include a core network entity, an application function, or an original equipment manufacturer. The consumer may correspond to the consumer 302 or 402 in FIG. 3 or 4. The analytics request from the consumer may be received via the network entity further based on the NWDAF supporting the area corresponding to a location in the analytics request.

As illustrated at 706, the NWDAF may provide an analytics response for the consumer to the network entity in response to the analytics request. The request and report in blocks 704 and 706 may include aspects of the communication exchanged between the NWDAFs and central entity in FIG. 3 or 4.

Each block in the aforementioned flowchart of FIG. 7 and/or the aspects that are performed by the NWDAF 306, 308, or 310 in FIG. 3 and/or the NWDAF 406 or 408 in FIG. 4 may be performed by a component of a network apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the network entity for wireless communication includes means for performing the method described in connection with FIG. 7. The aforementioned means may be one or more of the aforementioned components of an apparatus and/or a processing system of such an apparatus configured to perform the functions recited by the aforementioned means. The processing system may include a transmission processor, a reception processor, and a controller/processor. As such, in one configuration, the aforementioned means may be memory and the transmission processor, a reception processor, and a controller/processor configured to perform the functions recited by the aforementioned means.

The following examples are illustrative only and aspects thereof may be combined with aspects of other embodiments or teaching described herein, without limitation.

Example 1 is a method of wireless communication at a network entity, comprising: receiving an analytics request from a consumer, the analytics request indicating at least one analytic; and determining one or more network data analytics functions (NWDAFs) for the analytics request based on the at least one analytic indicated in the analytics request.

In Example 2, the method of Example 1 further includes that the at least one analytic is indicated by at least one analytics identifier included in the analytics request.

In Example 3, the method of Example 1 or Example 2 further includes forwarding the analytics request to the determined one or more NWDAFs that are determined; receiving an analytics response from each of the one or more NWDAFs; and providing the analytics response to the consumer.

In Example 4, the method of any of Examples 1-3 further includes that the analytics request includes a first analytics identifier and a second analytics identifier, and wherein the network entity determines a first NWDAF based on the first analytics identifier and a second NWDAF based on the second analytics identifier.

In Example 5, the method of any of Examples 1-4 further includes that the network entity receives a first analytics response from the first NWDAF and a second analytics response from the second NWDAF, and wherein the network entity provides the first analytics response and the second analytics response to the consumer.

In Example 6, the method of any of Examples 1-5 further includes receiving an analytics identifier registration from the one or more NWDAFs prior to receiving the analytics request from the consumer, wherein the one or more NWDAFs are determined for the analytics request further based on the analytics identifier registration from the one or more NWDAFs.

In Example 7, the method of any of Examples 1-6 further includes that the network entity receives multiple analytics identifier registrations from multiple NWDAFs, and wherein the network entity determines the one or more NWDAFs from the multiple NWDAFs based on matching a corresponding analytics identifier in the analytics request to a supported analytics identifier for the one or more NWDAFs from the analytics identifier registration of the one or more NWDAFs.

In Example 8, the method of any of Examples 1-7 further includes that each analytics identifier registration from an NWDAF includes one or more analytics identifiers for analytics that are supported by the NWDAF.

In Example 9, the method of any of Examples 1-8 further includes that the analytics identifier registration further includes a supported area for the one or more NWDAFs.

In Example 10, the method of any of Examples 1-9 further includes that the analytics request further includes a location, and wherein the network entity determines the one or more NWDAFs for the analytics request further based on the location included in the analytics request and the supported area for the one or more NWDAFs.

In Example 11, the method of any of Examples 1-10 further includes that the network entity comprises a central NWDAF.

In Example 12, the method of any of Examples 1-11 further includes that the network entity comprises a network report function.

In Example 13, the method of any of Examples 1-12 further includes that the consumer comprises one of: a core network entity, an application function, or an original equipment manufacturer.

Example 14 is a device including one or more processors and one or more memories in electronic communication with the one or more processors storing instructions executable by the one or more processors to cause the device to implement a method as in any of Examples 1-13.

Example 15 is a system or apparatus including means for implementing a method or realizing an apparatus as in any of Examples 1-13.

Example 16 is a non-transitory computer readable medium storing instructions executable by one or more processors to cause the one or more processors to implement a method as in any of Examples 1-13.

Example 17 is a method of wireless communication at a consumer, comprising: sending an analytics request to a network entity, the analytics request including at least one analytics identifier; and receiving, from the network entity, a response to the analytics request, wherein the response includes an analytics output from one or more network data analytics functions (NWDAFs) based on the at least one analytics identifier included in the analytics request.

In Example 18, the method of Example 17 further includes that the analytics request includes a first analytics identifier and a second analytics identifier, and wherein the consumer receives, from the network entity, a first analytics output from a first NWDAF that supports the first analytics identifier and a second analytics output from a second NWDAF that supports the second analytics identifier.

In Example 19, the method of Example 17 or Example 18 further includes that the analytics request further includes a location, and wherein the analytics output is from the one or more NWDAFs further based on the location and an area supported by the one or more NWDAFs.

In Example 20, the method of any of Examples 17-19 further includes that the network entity comprises a central NWDAF.

In Example 21, the method of any of Examples 17-20 further includes that the network entity comprises a network report function.

In Example 22, the method of any of Examples 17-21 further includes that the consumer comprises one of: a core network entity, an application function, or an original equipment manufacturer.

Example 23 is a device including one or more processors and one or more memories in electronic communication with the one or more processors storing instructions executable by the one or more processors to cause the device to implement a method as in any of Examples 17-22.

Example 24 is a system or apparatus including means for implementing a method or realizing an apparatus as in any of Examples 17-22.

Example 25 is a non-transitory computer readable medium storing instructions executable by one or more processors to cause the one or more processors to implement a method as in any of Examples 17-22.

Example 26 is a method of wireless communication at a network data analytics function (NWDAF), comprising: sending an analytics identifier registration from the NWDAF to a network entity, wherein the analytics identifier registration indicates one or more analytics supported by the NWDAF; and receiving an analytics request from a consumer via the network entity based on the NWDAF supporting an analytic in the analytics request.

In Example 27, the method of Example 26 further includes that the one or more analytics supported by the NWDAF are indicated by one or more analytics identifiers (IDS).

In Example 28, the method of Example 26 or Example 27 further includes providing an analytics response for the consumer to the network entity in response to the analytics request.

In Example 29, the method of any of Examples 26-28 further includes that the analytics identifier registration further indicates an area supported by the NWDAF.

In Example 30, the method of any of Examples 26-29 further includes that the analytics request from the consumer is received via the network entity further based on the NWDAF supporting the area corresponding to a location in the analytics request.

In Example 31, the method of any of Examples 26-30 further includes that the network entity comprises a central NWDAF.

In Example 32, the method of any of Examples 26-31 further includes that the network entity comprises a network report function.

In Example 33, the method of any of Examples 26-32 further includes that the consumer comprises one of: a core network entity, an application function, or an original equipment manufacturer.

Example 34 is a device including one or more processors and one or more memories in electronic communication with the one or more processors storing instructions executable by the one or more processors to cause the device to implement a method as in any of Examples 26-33.

Example 35 is a system or apparatus including means for implementing a method or realizing an apparatus as in any of Examples 26-33.

Example 36 is a non-transitory computer readable medium storing instructions executable by one or more processors to cause the one or more processors to implement a method as in any of Examples 26-33.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method of wireless communication at a network entity comprised in a wireless network, comprising:
receiving, at the network entity, an analytics request from a consumer of the wireless network, the analytics request including a first analytics identifier and a second analytics identifier;

determining a first network data analytics function (NWDAF) based on the first analytics identifier indicated in the analytics request and a second NWDAF based on the second analytics identifier indicated in the analytics request;

forwarding, from the network entity, a request to multiple NWDAFs, including forwarding a first request to the first NWDAF based on the first analytics identifier indicated in the analytics request and forwarding a second request to the second NWDAF based on the second analytics identifier indicated in the analytics request;

receiving multiple analytics responses including an analytics response from each of the multiple NWDAFs, including receiving a first analytics response from the first NWDAF and receiving a second analytics response from the second NWDAF;

combining the multiple analytics responses into a combined analytics response, wherein the network entity provides the combined analytics response to the consumer based on a combination of the first analytics response that the network entity received from the first NWDAF and the second analytics response that the network entity received from the second NWDAF; and providing, to the consumer, the combined analytics response based on the combination of the first analytics response received from the first NWDAF and the second analytics response received from the second NWDAF.

2. The method of claim 1, further comprising:
receiving an analytics identifier registration from one or more NWDAFs prior to receiving the analytics request from the consumer, wherein the multiple NWDAFs are determined for the analytics request further based on the analytics identifier registration from the one or more NWDAFs.

3. The method of claim 2, wherein the network entity receives multiple analytics identifier registrations from the multiple NWDAFs, and wherein the network entity determines the multiple NWDAFs from the multiple NWDAFs based on matching a corresponding analytics identifier in the analytics request to a supported analytics identifier for a corresponding NWDAF from the multiple NWDAFs.

4. The method of claim 2, wherein each analytics identifier registration from an NWDAF includes one or more analytics identifiers for analytics that are supported by the NWDAF.

5. The method of claim 4, wherein the analytics identifier registration further includes a supported area for each of the multiple NWDAFs, and wherein the analytics request further includes a location, and wherein the network entity determines the multiple NWDAFs for the analytics request further based on the location included in the analytics request and the supported area for the multiple NWDAFs.

6. The method of claim 1, wherein the network entity comprises a central NWDAF or a network report function, and wherein the consumer of the wireless network comprises one of:
a core network entity,
an application function, or
an original equipment manufacturer.

7. An apparatus for wireless communication at a network entity of a wireless network, comprising:
a memory; and
at least one processor coupled to the memory and configured to:

receive, at the network entity, an analytics request from a consumer of the wireless network, the analytics request including a first analytics identifier and a second analytics identifier;

determine a first network data analytics function (NWDAF) based on the first analytics identifier indicated in the analytics request and a second NWDAF based on the second analytics identifier indicated in the analytics request;

forward, from the network entity, a request to multiple NWDAFs, wherein the network entity forwards a first request to the first NWDAF based on the first analytics identifier indicated in the analytics request and forwards a second request to the second NWDAF based on the second analytics identifier indicated in the analytics request;

receive multiple analytics responses including an analytics response from each of the multiple NWDAFs, including reception of a first analytics response from the first NWDAF and reception of a second analytics response from the second NWDAF;

combine the multiple analytics responses into a combined analytics response, wherein the network entity provides the combined analytics response to the consumer based on a combination of the first analytics response that the network entity received from the first NWDAF and the second analytics response that the network entity received from the second NWDAF; and provide, to the consumer, the combined analytics response based on the combination of the first analytics response received from the first NWDAF and the second analytics response received from the second NWDAF.

8. The apparatus of claim 7, wherein the at least one processor is further configured to:
receive an analytics identifier registration from one or more NWDAFs prior to reception of the analytics request from the consumer, wherein the at least one processor is configured to determine the multiple NWDAFs are determined for the analytics request further based on the analytics identifier registration from the one or more NWDAFs.

9. The apparatus of claim 8, wherein each analytics identifier registration from an NWDAF includes one or more analytics identifiers for analytics that are supported by the NWDAF.

10. The apparatus of claim 9, wherein the analytics identifier registration further includes a supported area for each of the multiple NWDAFs.

11. The apparatus of claim 10, wherein the analytics request further includes a location, and wherein the at least one processor is configured to determine the multiple NWDAFs for the analytics request further based on the location included in the analytics request and the supported area for the multiple NWDAFs.

12. The apparatus of claim 7, wherein the at least one processor is configured to receive multiple analytics identifier registrations from a plurality of NWDAFs, and determine the multiple NWDAFs from the plurality of NWDAFs based on match of a corresponding analytics identifier in the analytics request to a supported analytics identifier for a corresponding NWDAF from the multiple NWDAFs.

13. The apparatus of claim 7, wherein the network entity comprises a central NWDAF or a network report function, and wherein the consumer of the wireless network comprises one of:

a core network entity,
an application function, or
an original equipment manufacturer.

\* \* \* \* \*